(12) United States Patent
Phinney et al.

(10) Patent No.: US 7,628,850 B2
(45) Date of Patent: Dec. 8, 2009

(54) METHOD OF PRODUCING METAKAOLIN

(75) Inventors: Robin Phinney, Calgary (CA); Kelly Graham, Calgary (CA); Kevin Graham, Calgary (CA); Burl Aycock, Calgary (CA)

(73) Assignee: Whitemud Resources Inc., Calgary, Alberta (CA)

( * ) Notice: Subject to any disclaimer, the term of this patent is extended or adjusted under 35 U.S.C. 154(b) by 580 days.

(21) Appl. No.: 11/585,827

(22) Filed: Oct. 25, 2006

(65) Prior Publication Data

US 2007/0089644 A1    Apr. 26, 2007

Related U.S. Application Data

(60) Provisional application No. 60/730,025, filed on Oct. 26, 2005.

(51) Int. Cl.
    *C04B 14/10* (2006.01)
(52) U.S. Cl. .................. 106/486; 106/416; 106/718; 501/141; 501/145; 241/24.23
(58) Field of Classification Search ............... 106/486, 106/416, 718; 501/141, 145; 241/24.23
    See application file for complete search history.

(56) References Cited

U.S. PATENT DOCUMENTS

| | | | |
|---|---|---|---|
| 4,492,628 A | | 1/1985 | Young et al. |
| 5,047,375 A | | 9/1991 | Dunaway et al. |
| 5,143,599 A | | 9/1992 | Derdall et al. |
| 5,158,613 A | | 10/1992 | Sargeant et al. |
| 5,227,349 A | | 7/1993 | Matthews et al. |
| 5,393,340 A | * | 2/1995 | Slepetys et al. ............. 106/484 |
| 5,545,599 A | | 8/1996 | Pickering et al. |
| 5,792,251 A | * | 8/1998 | Smiley et al. ............... 106/484 |
| 5,891,326 A | | 4/1999 | Shi et al. |
| 6,186,335 B1 | | 2/2001 | Arringto-Webb et al. |
| 6,221,148 B1 | * | 4/2001 | Mathur et al. .............. 106/484 |
| 6,676,745 B2 | * | 1/2004 | Merkley et al. ............. 106/726 |
| 2008/0203365 A1 | * | 8/2008 | Gleeson et al. ............. 252/601 |

OTHER PUBLICATIONS

Philippacopoulos et al., "Characterization and Modeling of Cements for Geothermal Well Casing Remediation", (Geothermal Resources Council Transactions, vol. 24, pp. 81-86, San Francisco, 2000).
Shvarzman et al., "The Effect of Dehydroxylation/Amorphization Degree on Pozzolanic Activity of Kaolinite", (Cement and Concrete Research 33, pp. 405-416, 2003).
Garcia Guinea et al. "Thermoluminescence of Kaolinite", (Radiation Protection Dosimetry, vol. 84, Nos. 1-4, pp. 507-510, 1999, Nuclear Technology Publishing).
Kaloumenou, et al., "Effect of the Kaolin Particle Size On The Pozzolanic Behaviour Of The Metakaolinite Produced", (Journal of Thermal Analysis and Calorimetry, vol. 56, pp. 901-907, 1999).
Badogiannis et al., "Metakaolin As Supplementary Cementitious Material—Optimization of kaolin to metakaolin conversion", (Journal of Thermal Analysis and Calorimetry, vol. 81, pp. 457-462, 2005).
Kakali et al., "Thermal Treatment of Kaolin: The Effect Of Mineralogy On The Pozzolanic Activity", (Applied Clay Science 20, pp. 73-80, 2001).
Justice et al.,."Comparison Of Two Metakaolins And A Silica Fame Used As Supplementary Cementitious Materials", (Proc. Seventh International Symposium on Utilization of High-Strength/High Performance Concrete, Washington D.C., Jun. 20-24. 2005).
Bai et al., "Accelerating Early Strength Development of Concrete Using Metakaolin As An Admixture", (ISSN 1392-1320, Materials Science (Medžiagotyra), vol. 10, No. 4, pp. 338-344, 2004).
Ambroise et al., "Properties of Metakaolin Blended Cements", (ISSN 1065-7355, Advn Cem Bas Mat, 1994;1, pp. 161-168).
Badogiannis et al., "Exploitation Of Poor Greek Kaolins: Strength Development Of Metakaolin Concrete And Evaluatice By Means Of K-Value", (Cement and Science Research 34, pp. 1035-1041, 2004).
Batis et al., "The Effect of Metakaolin On The Corrosion Behaviour Of Cement Mortars", (Cement & Concrete Composites 27, pp. 125-130, 2005).
Sabins, "Use of Metakaolin For Oilwell Cementing", (CSI Technologies, prepared for Whitemeud Resources Inc., Nov. 2006).
Nejad, "Effect of Metakaolin on Durability of Concrete Structures And Bridges", (Thesis, University of Surrey, U.K., 1995).
"High Reactivity Metakaolin Utilized in High Performance Virginia Bridge", (ISG Resources, Case Study No. 5, Rev. Feb. 2003).

* cited by examiner

*Primary Examiner*—Paul Marcantoni
(74) *Attorney, Agent, or Firm*—Ogilvy Renault LLP

(57) ABSTRACT

A process for producing high grade metakaolin directly from kaolinzed sands ore body. In one embodiment, a source of kaolin ore is reduced in the size to a size distribution of between −2 inches and 10 mesh. The ore is then dried in a dryer at a temperature of not greater than 180° C. to a moisture content of not greater than 0.5% by weight to liberate kaolin and calcined at a temperature of not greater than 875° C. to produce metakaolin.

16 Claims, No Drawings

METHOD OF PRODUCING METAKAOLIN

CROSS-REFERENCE TO RELATED APPLICATIONS

This application claims priority from U.S. Provisional Application No. 60/730,025, filed Oct. 26, 2005.

FIELD OF THE INVENTION

The present invention relates to a method of producing metakaolin and more particularly, the invention relates to the formation of metakaolin using raw material directly from a kaolin ore body.

BACKGROUND OF THE INVENTION

Metakaolin is a very useful aluminosilicate material that has high value applications. For example, there is usage in various applications of the cement industry as found say with U.S. Pat. No. 6,230,804 and U.S. Pat. No. 5,158,613. With lower costs inherent in a new and simple metakaolin production process, the use of metakaolin could significantly increase, particularly in the cement industry, as high performance concretes formed with added metakaolin, are significantly stronger and more economically attractive.

The current method of producing metakaolin involves two distinct stages whereby high grade kaolin is first produced from kaolin ore in a multiple step procedure. The high grade kaolin is then heated in a high temperature furnace at about 500-900° C. to produce metakaolin. This is outlined in "Effect of Metakaolin on Durability of Concrete Structures and Bridges, V. H. Nejad, Univ. of Surrey, UK, 1995". With calcinations of kaolin, care must be taken to complete the dehydroxylation of kaolin, but prevent heating beyond this point since this leads to the formulation of unreactive mullite, $3Al2.2SiO2$.

The production of high grade kaolin contains a number of steps and these lead to complex and expensive processes to obtain good quality kaolin necessary as a feedstock to produce metakaolin. The complexity is amply illustrated in the art taught in U.S. Pat. No. 6,186,335 (February, 2001) by Arrington-Webb et al. The inventors of this art have indicated that in excess of six steps could be required to produce good quality kaolin product from kaolin ore. The complexity of the overall process is a major factor in high capital and operating costs and high kaolin costs leading to expensive metakaolin.

There is also significant additional art on record to support the view that using high quality kaolin for metakaolin production is complex and costly. This is particularly true as the higher grade kaolin ore reserves have been depleted leaving primarily lower grade, high impurity, kaolin reserves left as kaolin feedstock. References related to this include as examples, U.S. Pat. Nos. 5,891,326; 5,545,599; 5,227,349; 5,047,375 and 4,492,628.

The result of the complex process for producing metakaolin is that the use of metakaolin is quite limited by the high costs associated with current methods of production. In addition, many highly beneficial potential uses of metakaolin, such as high strength and high performance concretes, are not pursued due to high costs of metakaolin.

What is needed is a new and low cost process route for the manufacture of metakaolin so that new and economical formulations of metakaolin, with alternate concrete formulations, can be manufactured and sold at much better pricing to significantly expand market use through superior materials performance.

SUMMARY OF THE INVENTION

To overcome the difficulties with complex and high cost production processes for metakaolin, this application presents a new process for the manufacture and production of metakaolin directly from kaolin ore. In the simplest embodiment of the process, raw kaolin ore is crushed and fed to a co-current dryer operating at about 150° C. with airflow from a calciner. The material is tumbled in the dryer liberating the kaolin. Kaolin of less than 10 microns is entrained by the airflow passing through the dryer to a cyclone and baghouse. This material is then transferred to a calciner operating at about 825° C. for production of metakaolin. This simple three stage operation produces high quality metakaolin.

This reserve has not been successfully developed despite a number of commercialization efforts. The ore body is known for low brightness of about 75 GE and a consequent low quality of produced kaolin. Advanced multiple step kaolin processing technology (U.S. Pat. No. 5,143,599; Canadian Patent No. 1,292,856) failed to yield a commercial operation. However, the White Mud reserve appears to have a significant population of kaolin particles consisting of stacks of kaolin platelets.

Without being bound by this explanation, the unanticipated successful delamination of these stacks is believed to be a factor in the success of the instant process along with a heat driven kaolin liberation unit operation.

DETAILED DESCRIPTION OF THE PREFERRED EMBODIMENT

Apparatus is not illustrated in view of the fact that all components are readily apparent to one skilled.

Raw kaolin ore, typically 7-10% moisture, is fed to a rock crusher and ground so that the output material has a −2 inch sizing. The bulk of the material is in the −10 mesh size range. The less than 2 inch output from the rock crusher is fed to a co-current rotary dryer operated at 110 to 175° C. with a waste heat process air stream from a downstream calciner. After tumbling in the dryer, the product is liberated, reduced in size to micron dimensions and carried through by the process air stream to a cyclone and baghouse.

Although not bound by this explanation, it is believed that the following contributed to the process for metakaolin production. The dryer has a series of flights in it designed to bring the coarser material close to the top of the circular arc of the dryer before falling down to the bottom of the dryer.

This vertical fall of lumps and particles as the dryer rotates generates an internal pulverization action. The tumbling of the dryer and the attrition action between particles breaks down the coarser kaolin ore lumps. This degradation is assisted by the liberation action of dehydration of the matrix at a temperature of about 150° C.

Once the ore reaches 0.5% and less moisture, there is significant liberation of the kaolin from the ore. The ore rapidly breaks down producing a −20 to −150 mesh working medium or matrix. The heat of the operation therefore assists in the liberation of the kaolin from the ore. It is also believed that the action of the ore matrix in the dryer de-laminates and liberates finer kaolin particles and stacks through a shearing process.

The matrix is primarily sand and therefore, with a similar density to the kaolin product, tends to shear the kaolin stacks rather than fracture them. The residence time is preferably in between 5 and 40 minutes, with 20 minutes being typical. Although not intended to be bound by this explanation, the platelet formation from stacks due to matrix pulverization and shearing action may well be assisted by steam pressure generated from an interplatelet molecular film of water during the high temperature pulverization process.

The tumbling action in the dryer may be said to be similar to that found with autogenous tumbling mills (Perry's Chemical Engineers Handbook, $6^{th}$ Ed., p 8-34) but the operations relating to kaolin liberation, delamination and steam assisted shearing is not taught in the art nor is the preferred sizing, temperature, residence time, and nature of the shearing matrix. In addition, the dryer air flow process stream size classification wherein product is carried to a cyclone/baghouse is also absent the prior art. In summary, the features established supra are not taught in the art for the production of metakaolin.

Course material is drawn off the bottom of the co-current dryer and can be further processed if desired. The coarse material is passed through a scalping screen to remove the rocks. The undersize material is sent to a cage mill operating at about 1000 rpm where it undergoes attrition. The fine material goes to a cyclone where additional −20 micron kaolin is separated and fed to a calciner.

The −20 micron material is sent to a calciner held at 825° C. with a residence time of 0.5 hours for a rotary calciner. The product is then transferred to a cooler and then to product storage. Warm exhaust air from the calciner is sent to the rotary dryer to enhance the de-lamination process in the manner previously cited.

The overall manufacturing technique is a simple synchronous three step process in stark contrast to the prior art for producing metakaolin. Based upon prior unsuccessful attempts at the low quality kaolin ores, this process yielded the completely unexpected result of high quality metakaolin from a low grade kaolin ore body in a simple synchronous process.

Table 1 provides data evincing the high efficacy of the metakaolin produced by this process. With a regular 30 MPa concrete, the strength test gave results of 37.1 MPa after 28 days and 46.9 MPa after 91 days for a 15% cement replacement. With 20% metakaolin replacement of cement, the 28 day result was 39.8 MPa and the 91 day test was 46.7 MPa. The use of metakaolin, with its many beneficial properties including cost and favorable formulation characteristics and the outperformance of standard concrete mixes with 15 and 20% less cement.

Whitemud Metakaolin Evaluation

Cement Replacement

TABLE 1

| | Mix Proportions | | | | | | | Test Results | | | | | | | |
|---|---|---|---|---|---|---|---|---|---|---|---|---|---|---|---|
| Mix No. | Cem | Fly Ash | Metakaolin | Water | Sand | 14 mm | 28 mm | Slump mm | Conc. Temp | 3 day | 7 day | 28 day | 56 day | 91 day | Init set hrs. | Final set hrs. |
| Control | 240 | 60 | | 160 | 844 | 630 | 430 | 90 | 16 | 19.8 | 28.0 | 37.1 | 44.5 | 46.9 | 6.8 | 9.1 |
| 2 | 204 | 60 | 36 (15%) | 169 | 779 | 630 | 430 | 80 | 17 | 15.9 | 30.2 | 40.8 | 45.3 | 48.3 | 6.0 | 7.9 |
| 3 | 192 | 60 | 48 (20%) | 184 | 788 | 630 | 430 | 80 | 17 | 15.4 | 30.2 | 39.8 | 42.3 | 46.7 | 5.7 | 7.7 |
| 4* | 163 | 60 | 29 (15%) | 177 | 861 | 630 | 430 | 80 | 18 | 10.4 | 19.5 | 29.0 | 31.0 | 34.0 | 6.6 | 8.9 |
| 5* | 154 | 60 | 38 (20%) | 182 | 845 | 630 | 430 | 80 | 17 | 9.1 | 18.9 | 28.8 | 31.8 | 35.1 | 6.6 | 9.5 |
| 8* | 163 | 60 | 29 (15%) | 183 | 861 | 630 | 430 | 80 | 17 | 10.7 | 20.3 | 30.5 | 31.8 | 38.2 | 6.3 | 8.8 |
| 9* | 154 | 60 | 38 (20%) | 182 | 845 | 630 | 430 | 80 | 17 | 9.3 | 20.0 | 30.6 | 32.4 | 36.2 | 6.3 | 8.7 |

*20% less cement and Metakaolin
All mixes contain water reducer @ 280 ml. per 100 kg. of cementitious.
Percentage of Metakaolin is of cement only
Mixes 8 and 9 - enhanced Metakaolin (experimental product)

In testwork in comparison with fumed silica, an expensive concrete setting agent, metakaolin produced by the process set forth here in proved very effective. Table 2 highlights the results in a sample of 15% fume silica, the 28 day strength was 41.3 MPa while the 91 day test had a strength of 45.3 MPa. With 15% metakaolin, the 28 day test was 40.8 MPa while it was 48.3 MPa at 91 days.

Whitemud Metakaolin Evaluation

Comparison of Metakaolin to Silica Fume

TABLE 2

| | Mix Proportions | | | | | | | | Test Results | | | | | | | |
|---|---|---|---|---|---|---|---|---|---|---|---|---|---|---|---|---|
| Mix No. | Cem | Fly Ash | Silica Fume | Metakaolin | Water | Sand | 14 mm | 28 mm | Slump mm | Conc. Temp | 3 day | 7 day | 28 day | 56 day | 91 day | Init set hrs. | Final set hrs. |
| 2 | 204 | 60 | | 36 (15%) | 169 | 779 | 630 | 430 | 80 | 17 | 15.9 | 30.2 | 40.8 | 45.3 | 48.3 | 6.0 | 7.9 |
| 10 | 204 | 60 | 36 (15%) | | 197 | 783 | 630 | 430 | 80 | 17 | 16.5 | 25.3 | 41.3 | 45.0 | 45.3 | 6.6 | 9.0 |
| 11 | 221 | 60 | | 19 (8%) | 184 | 811 | 630 | 430 | 70 | 17 | 18.4 | 28.0 | 39.6 | 41.7 | 46.7 | 5.9 | 7.9 |
| 12 | 221 | 60 | 19 (8%) | | 187 | 785 | 630 | 430 | 80 | 17 | 20.3 | 29.4 | 47.1 | 49.4 | 52.7 | 6.4 | 7.8 |

All mixed contain water reducer @ 280 ml. per 100 kg. of cementitious
Percentage of Metakaolin is of cement only These tests clearly indicate the high performance of the metakaolin produced by this process as a very economic concrete additive.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A method for producing metakaolin, comprising:
providing a source of kaolin ore;
reducing the size of said ore to provide a size distribution of between −2 inches and 10 mesh;
drying reduced size ore in a dryer at a temperature of not greater than 180° C. to a moisture content of not greater than 0.5% by weight to liberate kaolin; and
calcining kaolin of less than 30 microns at a temperature of not greater than 875° C. to produce metakaolin.

2. The method as set forth in claim 1, wherein said drying is performed in a counter current rotary dryer.

3. The method as set forth in claim 1, wherein said drying is performed in a temperature range of between 100° C. and 180° C.

4. The method as set forth in claim 1, wherein said kaolin has a moisture content in the range of between 5% and 20% by weight.

5. The method as set forth in claim 1, further including the step of passing calcined kaolin of less than 30 microns to a cyclone.

6. The method as set forth in claim 4, further including the step of collecting cycloned metakaolin in a baghouse.

7. The method as set forth in claim 1, wherein said kaolin is calcined at a temperature of between 750° C. and 875° C.

8. The method as set forth in claim 7, wherein said kaolin is calcined at a temperature of between 750° C. and 875° C. for between 5 and 40 minutes.

9. A cement mix additive made in accordance with the method of claim 1.

10. A cement composition, comprising:
Portland cement; and
metakaolin made in accordance with the method of claim 1.

11. A method for producing metakaolin, comprising:
providing a source of kaolin ore in a size distribution of between −2 inches and 10 mesh;
exposing said ore to a drying operation, said operation including:
delaminating said kaolin ore from a stacked crystal formation;
simultaneously shearing said stacked crystal formation to produce −30 micron kaolin; and
exposing said −30 micron kaolin to a second drying operation at a temperature of not greater than 875° C. to produce metakaolin.

12. The method as set forth in claim 11, wherein said calcining is performed in a counter current dryer at a temperature of between 750° C. and 875° C. for between 20 and 40 minutes.

13. The method as set forth in claim 11, wherein said shearing is steam assisted shearing, said steam evolving from moisture retained in said kaolin.

14. The method as set forth in claim 11, further including the step of passing calcined kaolin of less than 30 microns to a cyclone.

15. The method as set forth in claim 14, further including the step of collecting metakaolin in a baghouse.

16. A cement composition, comprising:
Portland cement; and
metakaolin made in accordance with the method of claim 11.

* * * * *